(12) United States Patent
Fujii et al.

(10) Patent No.: US 6,651,786 B2
(45) Date of Patent: Nov. 25, 2003

(54) BAND BRAKE ASSEMBLY

(75) Inventors: Yuji Fujii, Ann Arbor, MI (US); Ted Duane Snyder, Brighton, MI (US); Anthony Joseph Grzesiak, Sauk Village, IL (US); Christopher Charles Denault, Lowell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,109

(22) Filed: Nov. 19, 2001

(65) Prior Publication Data

US 2003/0094336 A1 May 22, 2003

(51) Int. Cl.[7] ................................. F16D 65/78
(52) U.S. Cl. ................. 188/264 B; 188/77 W; 188/264 D; 188/264 R; 188/264 E; 192/113.3
(58) Field of Search ............... 188/77 W, 77 R, 188/264 B, 264 F, 264 D, 264 R, 264 E; 192/113.3, 70.12, 113.34

(56) References Cited

U.S. PATENT DOCUMENTS

| | | | |
|---|---|---|---|
| 3,321,999 A | * 5/1967 | Greer | ............... 188/264 B |
| 5,135,082 A | 8/1992 | Umezawa et al. | |
| 5,238,091 A | 8/1993 | Nakagawa et al. | |
| 5,328,008 A | * 7/1994 | Sano | ..................... 192/17 R |
| 5,421,439 A | * 6/1995 | Hayasaki | ............... 192/85 AA |
| 5,467,849 A | 11/1995 | Nakagomi et al. | |
| 5,474,158 A | 12/1995 | Fukasawa et al. | |
| 5,495,927 A | * 3/1996 | Samie et al. | ............. 192/70.12 |
| 5,735,369 A | * 4/1998 | Tsukamoto et al. | ....... 188/77 R |
| 5,975,253 A | 11/1999 | Umezawa et al. | |
| 6,206,163 B1 | * 3/2001 | Schneider | .............. 192/113.35 |

FOREIGN PATENT DOCUMENTS

JP        8-284989     * 11/1996

* cited by examiner

*Primary Examiner*—Jack Lavinder
*Assistant Examiner*—Mariano Sy

(57) ABSTRACT

A band brake drum assembly (50) is provided and includes a brake band member (52), a generally round and/or cylindrical and brake drum (54) which is disposed concentric to band (52), and an input or hub shaft (56 which is fixedly coupled to and rotatably drives drum (54). Drum includes an interior surface having a recessed portion (62) which is effective to retain a certain amount of lubricant or oil within the drum, and several relatively large drainage holes (70) which are effective to quickly drain excess lubricant from drum (54), thereby providing a consistent amount of lubricant wit in drum (54) and improving the overall performance of the brake band assembly.

10 Claims, 4 Drawing Sheets

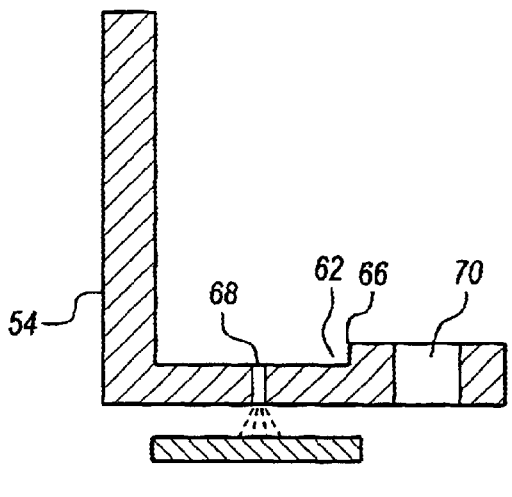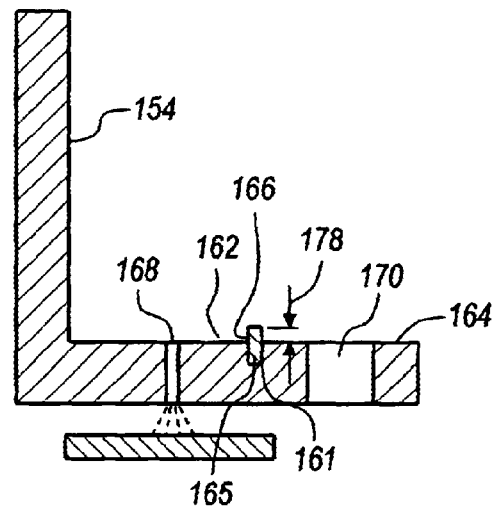
FIGURE 6A                FIGURE 6B
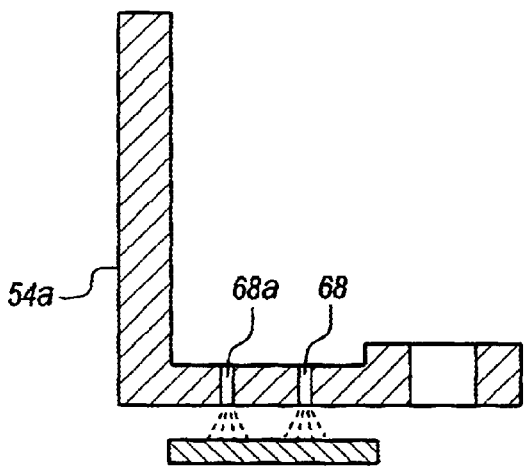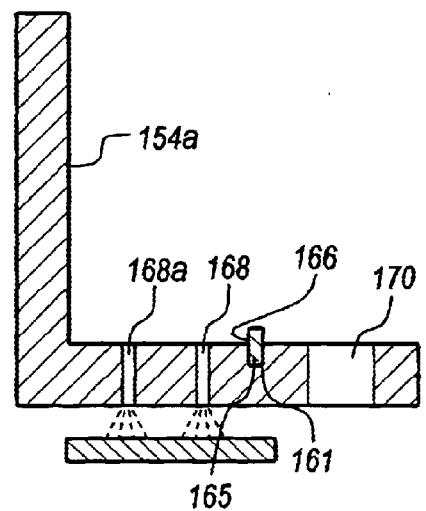
FIGURE 6C                FIGURE 6D

BAND BRAKE ASSEMBLY

BACKGROUND OF INVENTION

1. Field of the Invention

This invention relates to a band brake assembly and more particularly, to a band brake assembly for use in a vehicle and having a drum with improved lubrication flow control.

2. Background of the Invention

Band brakes are generally employed within automatic transmissions in order to perform gear shifts within the transmissions. For example and without limitation, shifting a "step-ratio" type automatic transmission is accomplished by selectively applying and releasing friction elements such as band brakes which are assigned to various rotating elements or gears (e.g., planetary gears) within the transmission.

A conventional band brake includes a band, a drum, and a hydraulic servo. The band-drum interface is lubricated with an oil. The drum is directly connected to a planetary gear or other automotive transmission component. When the band brake is actuated, it frictionally engages the drum, effective to hold connected components while altering a gear configuration for automatic shifting. Thus, the band engagement dynamics directly affect automotive transmission shift quality. Consistent band behavior in repeated engagements or under varying operating conditions is vital to providing and maintaining good shift quality.

However, in a conventional automotive transmission system, the band-drum engagement behavior varies significantly due to varying lubrication flow into the band-drum interface. Typically, the lubricant (e.g., oil) is first routed to the interior surface of the drum from the drum hub shaft. The rotation of the drum exerts a centrifugal force on the oil layer inside the drum. The amplitude of this force depends on the rotational speed of the drum and the oil layer thickness. The drum has small lubrication holes drilled through its shell. The centrifugal force pushes the oil through those holes into the band-drum interface. Prior art has relied upon the size, number, and location of lubrication holes to regulate the oil flow into the interface. However, the oil layer thickness inside the drum still varies widely under different operating conditions. As a result, a large variability still exists in the actual lubrication flow rate, causing widely varying engagement behavior. The band-drum engagement variability makes automatic transmission shift calibration more difficult, leading to inconsistent shift quality.

Referring now to FIG. 1, there is shown a sectional view of a prior art band brake assembly 10. As shown, a conventional brake band assembly 10 typically includes a band 12, a drum 14, and a hub shaft 16 which receives engine generated torque which is distributed through the transmission. The drum 14 is fixedly attached to the hub shaft 16 or other rotating components (not shown). The drum 14 shown in FIG. 1 rotates with the hub shaft 16. The drum is generally hollow and typically houses other conventional transmission components 26. The drum includes several oil-lubrication holes 18 which are typically drilled through the drum 14. The hub shaft 16 includes oil distribution channels 20 which are formed within the shaft 16 and which communicate with apertures 22 which release and/or discharge the oil into the inside of drum 14. When a relatively large oil flow exists under certain transmission operating conditions, a relatively thick oil layer 24 may accumulate inside the drum 14. This relatively thick oil layer 24 may induce an excessive lubrication at the band-drum interface unless the oil is drained elsewhere. This excessive lubrication is particularly detrimental to the engagement behavior at low oil temperatures due to strong hydrodynamic effects. It may also lead to increased parasitic torque loss when the band is not engaged. While some attempts have been made to direct the oil into a low flow resistance area for draining purposes, this has led to lubrication deficiencies at the band-drum interface at high oil temperatures. These lubrication deficiencies potentially cause a very abrupt engagement behavior, increased band-drum interface temperature, and reduced band durability.

There is therefore a need for a new and improved band brake drum assembly which overcomes many, if not all, of the previously delineated drawbacks of such prior vehicle band brake drum assemblies, and which provides for reduced engagement variability.

SUMMARY OF INVENTION

A first non-limiting advantage of the invention is that it provides a band brake drum assembly which overcomes at least some of the previously delineated drawbacks of prior assemblies and which effectively controls the oil layer thickness inside the drum under all operating conditions, thereby providing a consistent oil flow into the band-drum interface and consistent engagement behavior.

A second non-limiting advantage of the invention is that it provides a band brake drum assembly having lubrication flow control attributes which are effective to reduce the variability in lubrication flow within the band interface.

A third non-limiting advantage of the invention is that it provides a band brake drum assembly for use in an automatic transmission system which reduces the variability in engagement and shifting characteristics.

A fourth non-limiting advantage of the invention is that it provides a band brake drum assembly having reduced parasitic torque loss at the band-drum interface due to regulated lubrication flow.

A fifth non-limiting advantage of the invention is that it provides a band brake drum assembly with improved oil draining flow which is effective to reduce parasitic torque loss in the rotating components of the assembly.

According to a first aspect of the present invention, a drum is provided for use within a band brake assembly. The drum includes interior surface which receives lubricant, a shoulder which is disposed upon the interior surface and which forms a lubricant retention area for holding an amount of the lubricant, at least one lubricant hole formed within the lubricant retention area, the hole communicating with a band-drum interface exterior to the drum and allowing at least a portion of the lubricant to be communicated from the drum to the band-drum interface, and at least one lubricant draining hole which is formed outside of the lubricant retention area and which is effective to drain excess lubricant from the drum.

According to a second aspect of the present invention, a band brake assembly is provided and includes a selectively actuatable brake band member; a selectively rotatable shaft having at least one channel which selectively distributes an amount of lubricant and an aperture which communicates with the channel and which selectively discharges the lubricant; and a generally cylindrical rotating drum which is fixedly coupled to the selectively rotatable components such as a shaft, the drum including an interior surface which receives an amount of lubricant, a recessed lubricant retention portion which is formed upon the interior surface and which selectively receives and holds an amount of the discharged lubricant, a plurality of lubricant holes formed within the lubricant retention portion, the lubricant holes communicating with an exterior portion of the drum which is selectively engaged by the brake band member and allowing at least a portion of the lubricant to be communicated to the exterior portion of the drum, and a plurality of lubricant draining holes which are formed outside of the lubricant retention portion and which is effective to drain excess lubricant from the drum.

According to a third aspect of the present invention, a method is provided for controlling the amount of lubricant within a transmission band brake drum. The method includes the steps of: forming a lubricant retention area on the inside surface of the transmission band brake drum, effective to retain a certain amount of lubricant; and draining excess lubricant from the band brake drum which flows outside of the lubricant retention area.

These and other features, aspects, and advantages of the invention will become apparent by reading the following specification and by reference to the following drawings.

BRIEF DESCRIPTION OF DRAWINGS

FIGS. 6A–6D are partial sectional views illustrating various embodiments of band brake drums which are made in accordance with the teachings of the present invention.

DETAILED DESCRIPTION

Figure 1:
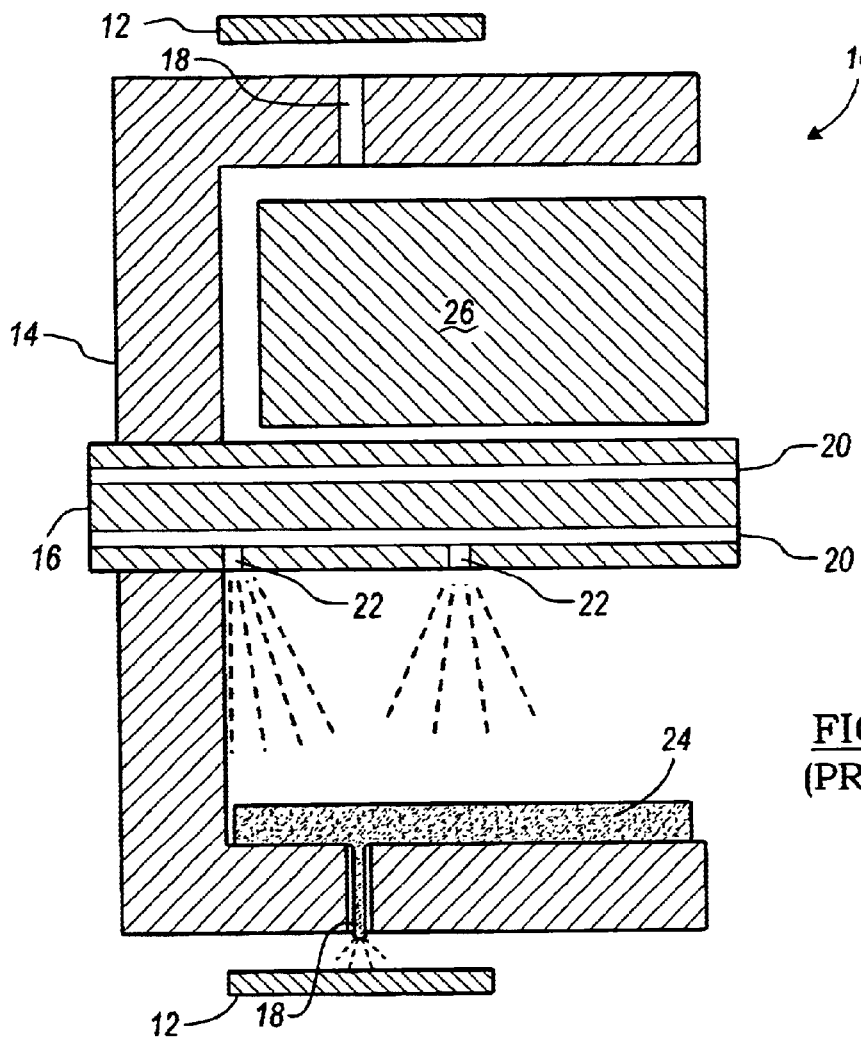
FIG. 1 is a sectional view a band brake assembly which is made in accordance with the teachings of the prior art.
Figure 3:
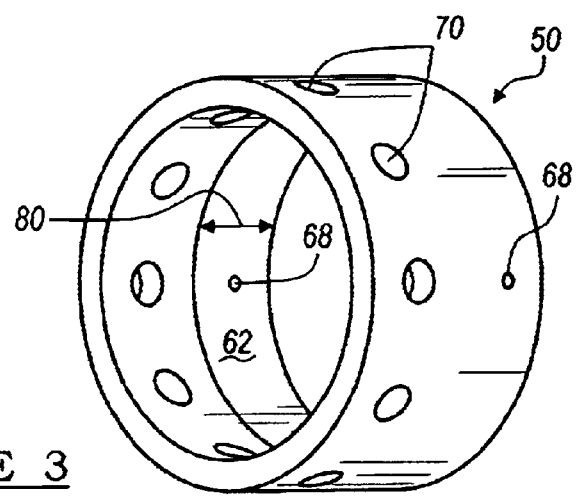
FIG. 3 is a perspective view of a drum used within the band brake assembly shown in FIG. 2.
Figure 2:
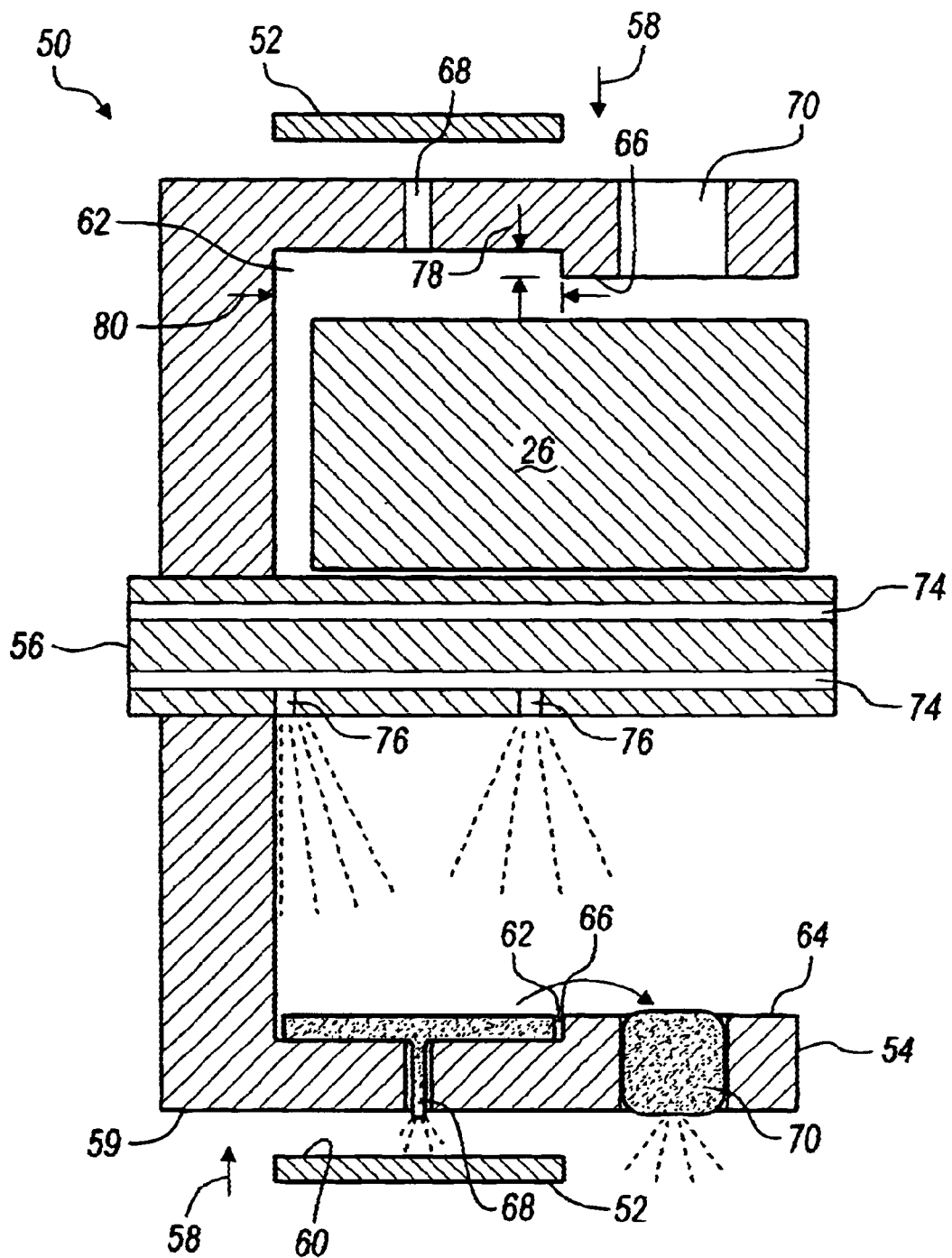
FIG. 2 is a sectional view of a band brake assembly which is made in accordance with the teachings of the preferred embodiment of the invention.
Figure 4:
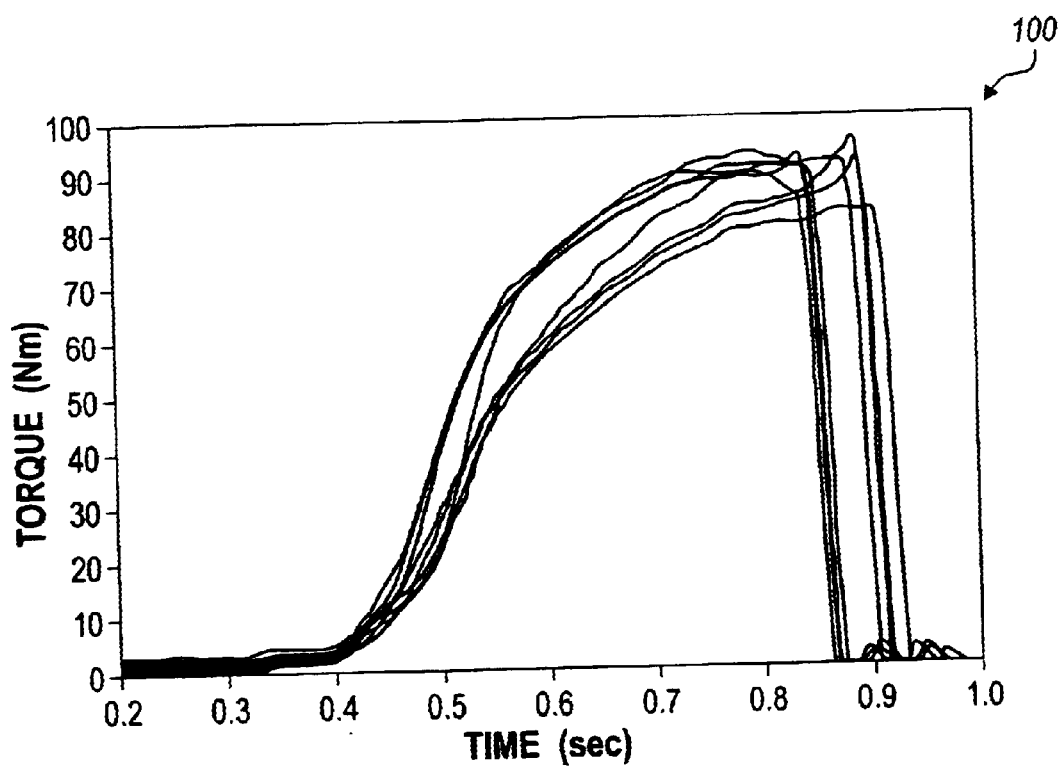
FIG. 4 is a graph of torque verses time for several band brake engagements utilizing a conventional band and drum.
Figure 5:
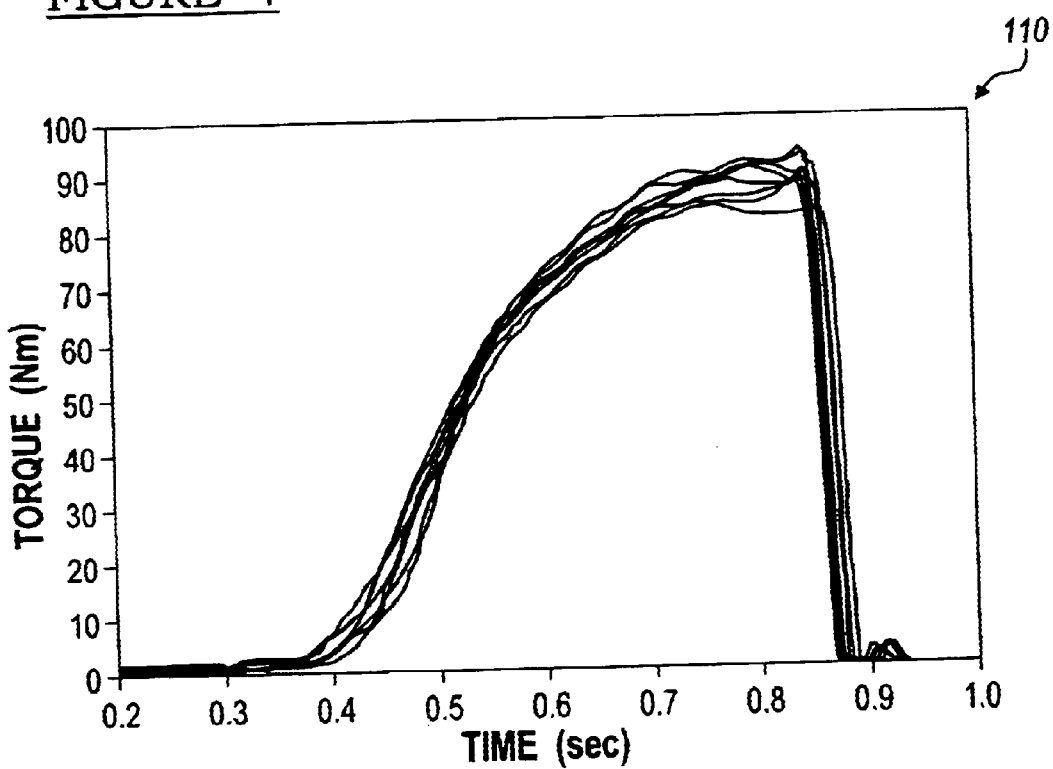
FIG. 5 is a graph of torque versus time for several band brake engagements utilizing the band brake assembly of the present invention.

Referring now to FIG. 2, there is shown a band brake assembly 50 which is made in accordance with the teachings of the preferred embodiment of the invention and which is adapted for use in combination with a vehicle of the type having an engine which operatively provides torque to an automatic transmission assembly. In the preferred embodiment, assembly 50 is operatively disposed within the vehicle's automatic transmission assembly. While the following discussion relates to a band brake assembly for use within an automatic transmission, it should be appreciated that assembly 50 may be used in virtually any other apparatus, device or assembly in which a brake band assembly may be useful or desirable.

Band brake assembly 50 includes a brake band member 52, a generally round and/or cylindrical band brake drum 54 which is disposed concentric to band 52, and an input or hub shaft 56 which is fixedly coupled to and rotatably drives drum 54.

Brake band 52 is generally cylindrical and is manufactured from a durable resilient material, such as a metal material. Band 52 is coupled to and actuated by a conventional actuating mechanism (not shown) which selectively "squeezes" band 52, thereby reducing the diameter of the band 52 and causing the band 52 to constrict in the directions of arrows 58. The inner surface 60 of band 52 is coated and/or covered with a conventional friction material (e.g., friction paper) which selectively engages the outer surface 59 of drum 54 when band 52 is actuated, thereby slowing and/or stopping the rotational movement of drum 54.

Drum member 54 is generally hollow and cylindrical and houses other conventional transmission components 72. The drum member 54 includes an annular recessed portion 62 which is formed on the interior surface 64 of drum 54 and which defines a lubricant retention area. A raised shoulder portion 66 is formed at and/or defines an end of recessed portion 62 and assists in retaining lubricant or oil within portion 62. Drum 54 further includes a plurality of relatively small lubrication apertures 68 which are formed in the recessed area 62 and which pass through the drum 54, thereby allowing for communication between the interior and exterior of the drum 54 (i.e., the band-drum interface). In the preferred embodiment, drum 54 includes about four lubrication apertures 68 which are disposed in a "ring" or circular configuration around drum 54. The apertures 68 and recessed area 62 are aligned with band 62, such that when band 62 engages drum 54, it engages the portion of the outer surface 59 of drum 54 which includes apertures 68 (i.e., the band-drum interface). Drum 54 further includes a plurality of relatively large draining apertures 70 which are formed immediately or close to outside of the recessed area 62 and which pass through the drum 54, thereby allowing for further communication between the interior and exterior of the drum 54 without interfering a part of the outer surface 59 where the band 52 makes a contact during the engagement. In the preferred embodiment, drum 54 includes approximately twelve draining apertures 70 which are disposed in a "ring" or configuration around drum 54. It should be appreciated that the exact number and/or size of apertures 68, 70 may depend on the various desired structural and/or functional attributes of assembly 50.

Hub shaft 56 is a conventional cylindrical hub shaft including several internal oil distribution channels 74 which are communicatively coupled to a conventional source of pressurized lubricating oil or fluid (not shown). Several apertures 76 are formed within hub shaft 56 and communicate with channels 74. Particularly, apertures 76 receive pressurized lubricant from channels 74 and emit or discharge the lubricant inside drum 54, thereby lubricating the drum and transmission components 72. In the preferred embodiment of the invention, discharge apertures 76 are formed along a portion of the length of shaft 56 that is aligned with recessed area 62. In this manner, the majority of lubricant discharged by apertures 76 is discharged into the recessed area 62.

Drum member 54 is generally hollow and cylindrical and houses other conventional transmission components 72. Th drum member 54 includes an annular recessed portion 62 which is formed on the interior surface 64 of drum 54 and which defines a lubricant retention area. A raised shoulder portion 62 is formed at and/or defines an end of recessed portion 62 and assists in retaining lubricant or oil within portion 62. Drum 54 further includes a plurality of relatively small lubrication apertures 68 which are formed in the recessed area 62 and which pass through the drum 54, thereby allowing for communication between the interior and exterior of the drum 54 (i.e., the band-drum interface). In the preferred embodiment, drum 54 includes about four lubrication apertures 68 which are disposed in a "ring" or circular configuration around drum 54. The apertures 68 and recessed area 62 are aligned with band 52, such that when band 52 engages drum 54, it engages the portion of the outer surface 59 of drum 54 which includes apertures 68 (i.e., the band-drum interface). Drum 54 further includes a plurality of relatively large draining apertures 70 which are formed immediately or close to outside of the recessed area 62 and which pass through the drum 54, thereby allowing for further communication between the interior and exterior of the drum 54 without interfering a part of the outer surface 59 where the band 52 makes a contact during the engagement. In the preferred embodiment, drum 54 includes approximately twelve draining apertures 70 which are disposed in a "ring" or configuration around drum 54. It should be appreciated that the exact number and/or size of apertures 68, 70 may depend on the various desired structural and/or functional attributes of assembly 50.

In this manner, the band brake assembly 50 and novel drum design provides for reduced engagement variability. The assembly 50 effectively controls the oil layer thickness inside the drum 54 under substantially all operating conditions. The consistent lubricant or oil layer thickness leads to a consistent lubrication flow into the band-drum interface and a consistent engagement behavior.

In operation, pressurized lubricant or oil is pumped or otherwise introduced into channels 74 of shaft 56. The lubricant exits the shaft 56 through apertures 76 and coats the interior surface 64 of drum 54. Due to the oil flow control attributes of the drum 54, the amount of this lubricant or oil which is fed into the drum 54 does not need to be accurately regulated. As the lubricant is discharged, it may flow through other transmission components 72 positioned inside the drum 54 before reaching the interior surface 64 of drum 54. The majority of the lubricant flows into and is retained by the lubricant-capturing or retention area 62. The depth 78 of area 62 or the height of shoulder 66 determines the amount of lubricant retained and the magnitude of centrifugal force generated by the rotating lubricant or oil layer. This centrifugal force pushes some of the lubricant or oil to the exterior of drum 54 and into the band-drum interface through the lubrication holes 68. When the amount of lubricant inside drum 54 is excessive, the excess lubricant flows over the raised shoulder 66 into the relatively large draining holes 70. In this manner, the present invention allows for excess lubricant to be relatively quickly removed from the system, thereby eliminating the potential adverse effects (i.e., parasitic torque loss) which may be caused by such excess lubricant. When the amount of lubricant within drum 54 is relatively small, substantially all of the lubricant is effectively trapped in the lubricant-capturing area 62 and is fed to the band-drum interface. Particularly, the raised shoulder 66 substantially prevents this oil from escaping are 62, thereby maintaining a substantially consistent lubricant or oil layer thickness within drum 54. The consistent lubricant or oil layer thickness, determined by the depth 78 of the lubricant-capturing area 62 (or by the height of shoulder 166), provides a substantially consistent lubrication flow rate at the band-drum interface, thereby desirably reducing engagement variability. In the preferred embodiment of the invention, the precise geometry (e.g., shape, size and position) of the lubrication holes 68, the lubricant-capturing area 62, and the draining holes 70 are designed to meet the lubrication requirements of the band friction material and/or by other desired attributes or applications of assembly 50. In one non-limiting embodiment, the width 80 of lubricant retention area 62 is approximately 19 mm, the depth 78 of area 62 is approximately 0.5 mm, and drainage holes 70 are approximately 10 mm in diameter.

FIGS. 6A–6D illustrate various drum embodiments for use in the present invention. FIG. 6A illustrates the afore-described drum 54 which includes a recessed portion 62, which may be machined or otherwise conventionally formed on the interior surface 64 of drum 54. FIG. 6B illustrates an alternative embodiment of the drum 154 which is substantially identical to drum 54 with the following differences. Recessed portion 62 has been replaced with includes a relatively thin annular groove 161 which houses an annular ring or member 165, which is fixedly disposed (i.e., press-fitted) within groove 161 and which forms a oil retention shoulder 166. Particularly, ring 165 extends inward a certain length 178 from the inner surface 164 of drum 154, thereby forming retention shoulder 166. It should be appreciated that shoulder 166 serves a substantially similar function as shoulder 66 in forming an oil or lubricant capturing area 162. Lubrication apertures 168 and draining apertures 170 are substantially identical to apertures 68 and 70, respectively. FIG. 6C illustrates another non-limiting drum embodiment 54a. Drum 54a is substantially identical in structure and function to drum 54 with the exception that an additional "ring" or set of lubrication apertures 68a have been formed in a configuration which is substantially parallel to the ring of apertures 68. Apertures 68a provide for improved oil distribution within the band-drum interface. FIG. 6D illustrates yet another non-limiting drum embodiment, drum 154a. Drum 154a is substantially identical in structure and function to drum 154 with the exception that an additional "ring" or set of lubrication apertures 168a have been formed in a circular configuration which is substantially parallel to the ring of apertures 68. Apertures 168a provide for improved oil distribution within the band-drum interface.

It is to be understood that the invention is not to be limited to the exact construction and/or method which has been illustrated and discussed above, but that various changes and/or modifications may be made without departing from the spirit and the scope of the invention.

What is claimed is:

1. A band brake assembly comprising:
   a selectively actuatable brake band member;
   a selectively rotatable shaft having at least one channel which selectively distributes an amount of lubricant and an aperture which communicates with said channel and which selectively discharges said lubricant; and
   a generally cylindrical rotating drum which is fixedly coupled to said selectively rotatable shaft said including an interior surface which receives an amount of lubricant, a recessed lubricant retention portion which is formed upon said interior surface and which selectively receives and holds an amount of said discharged lubricant, a plurality of lubricant holes formed within the lubricant retention portion, said lubricant holes communicating with an exterior portion of said drum which is selectively engaged by said brake band member and allowing at least a portion of said lubricant to be communicated to said exterior portion of said drum, and a plurality of lubricant draining holes which are formed outside of said lubricant retention portion and outside of said exterior portion of said drum which is selectively engaged by said brake band member and which is effective to rain excess lubricant from said drum.

2. The band brake assembly of claim 1 further comprises a shoulder which is formed at an end of said lubricant retention portion.

3. The band brake assembly of claim 1 wherein said brake band member comprises an amount of friction paper which is disposed on an interior surface of said brake band member and which selectively engages, said exterior surface of said drum.

4. The band brake assembly of claim 1 wherein said plurality of lubricant drainage holes are larger in size than each of said plurality of lubrication holes.

5. The band brake assembly of claim 1 wherein said plurality of lubrication holes are formed in a circular configuration around said drum.

6. The band brake assembly of claim 5 further comprising a second plurality of lubrication holes which are form in within said lubricant retention portion in a second circular configuration around said drum.

7. The band brake assembly of claim 1 wherein said plurality of drainage holes are formed in a circular configuration around said drum.

8. A drum for use within a band brake assembly, said drum comprising:

an interior surface which receives lubricant;

a shoulder which is disposed upon said interior surface and which forms a lubricant retention area for holding an amount of lubricant;

at least one lubricant hole formed within the lubricant retention area, said at least one lubricant hole communicating with a band-drum interface exterior to said drum and allowing at least a portion of said lubricant to be communicated from said drum to said band-drum interface; and at least one lubricant draining hole which is formed outside of said lubricant retention area and which is effective to drain excess lubricant from said drum wherein said at least one lubricant draining hole comprises twelve drainage apertures.

9. A method for controlling an amount of lubricant within a transmission and brake drum, said method comprising the steps of:

forming a lubricant retention area on an inside surface of said transmission band brake drum, effective to retain a certain amount of lubricant; and draining excess lubrication from said band brake drum which flows outside of said lubricant retention area by forming at least one relatively large aperture in said brake band drum outside of said lubricant retention area.

10. The method of claim 9 further comprising the steps of:

forming at least one lubrication aperture through said drum and within said lubricant retention area, said at least on lubrication aperture communicating with the exterior of said drum and selectively providing lubricant to a band-drum interface.

* * * * *